2,949,479
ACYL DERIVATIVES OF AMINONAPHTHALENE-SULFONAMIDE

Takeo Ueda, Tokyo, Sadatake Kato, Osaka-fu, Shigeshi Toyoshima, Osaka, and Tsuneo Wachi, Tokyo, Japan, assignors to Dainippon Pharmaceutical Co., Ltd., Higashi-ku, Osaka, Japan No Drawing. Original application June 17, 1954, Ser. No. 437,582. Divided and this application Apr. 5, 1957, Ser. No. 650,830

Claims priority, application Japan Sept. 17, 1953

6 Claims. (Cl. 260—401)

This invention relates to acyl derivatives of aminonaphthalenesulfonamide.

A few aminonaphthalenesulfonamide derivatives were reported on to some extent in E. H. Northey's work "The Sulfonamides and Allied Compounds" (1948), these compounds (I) being prepared, like most sulfanilamides, by condensing acetaminonaphthalenesulfonylchloride (II) with an amino compound (III) to produce substituted acetaminonaphthalenesulfonamide (IV) and hydrolyzing the latter. Upon examination of these compounds with respect to their antibiotic property, there was little or substantially no effectiveness. Therefore, it was reported that the compounds of this series were unpromising for use as antimicrobial drugs.

The proposed compounds were designated by the following formula

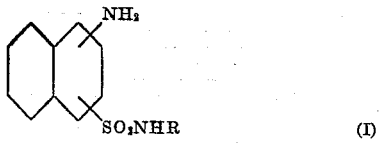

and prepared as follows:

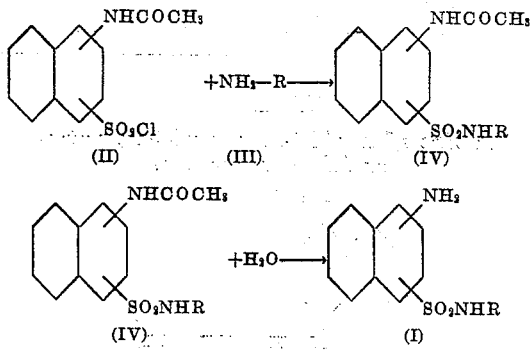

where R is one of several organic radicals other than acyl, e.g. a phenyl group.

According to the present invention, new acyl derivatives (V) of aminonaphthalenesulfonamide have been synthesized, which have not been reported by Northey or by any others. These new compounds show remarkable antiviral property and are useful as antiviral drugs.

The general formula of these compounds is

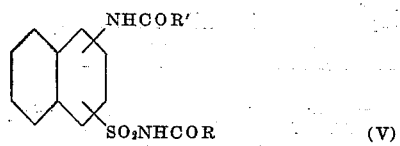

where R' is a lower alkyl radical (i.e. $C_1$–$C_4$) and R is a higher alkyl radical (i.e. $C_7$–$C_{18}$) and the NHCOR' and $SO_2NHCOR$ may be either on one and the same benzenoid nucleus of the naphthalene skeleton or on different nuclei thereof.

The compounds of this series may most conveniently be prepared by condensing a sulfonamide compound (VI) with an acyl halide (VII) or an acylation agent such as an acid anhydride. The method is illustrated by the following chemical equation:

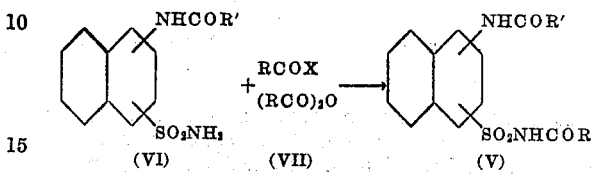

where R and R' are as defined above, and X is halogen.

Alternatively, one may start with aminonaphthalenesulfonamide:

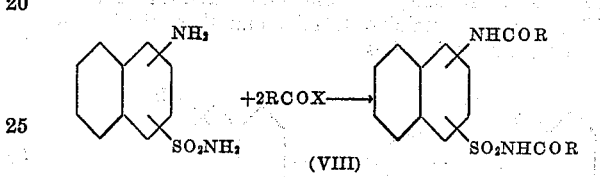

The acylaminonaphthalenesulfonacylamide (VIII) is then hydrolyzed, aminosulfonacylamide (X) being obtained as follows:

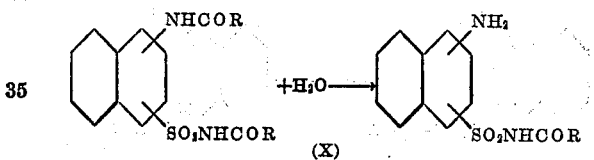

The hydrolysis may be affected in a medium such as water or an organic solvent in the presence of an acid or base with heating.

The aminosulfonacylamide (X) may be converted into the desired acylaminonaphthalenesulfonacylamide as follows:

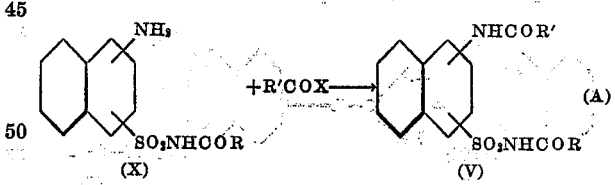

In any of these condensation reactions, water and organic solvents as well as aqueous organic solvents are employed as medium, and basic substances are added as neutralizing agents to promote the reactions. Among such neutralizing agents, pyridine and acetone give most favorable results, in general. The reaction temperature may be ambient but, in general, is preferably at the boiling point of the employed solvents, in which case the reaction rate is higher. The resultant acyl substituted aminonaphthalenesulfonamide is isolated from the reaction mixture by addition of an acid thereto, from which the added solvent is then distilled off. The isolated product is recrystallized from a suitable organic solvent to obtain the finished product, which may be neutralized with an alkaline substance to obtain water soluble alkaline material.

Alternatively, an acylation agent may be reacted with nitronaphthalenesulfonamide (XI) to produce nitronaphthalenesulfonacylamide (XII), which in turn is reduced to obtain the aminonaphthalenesulfonacylamide (X), thus

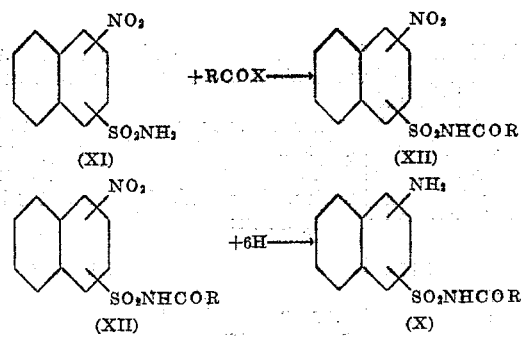

The first reaction may be achieved in manner similar to that in the aforementioned condensation reaction, while the second reaction may be achieved according to the conventional manner of reducing aromatic nitro compounds.

The aminonaphthalenesulfonacylamide may also be prepared by reacting aminonaphthalenesulfonylchloride (XIII) with an amidine (XIV), and then heating the same with an acid, thus

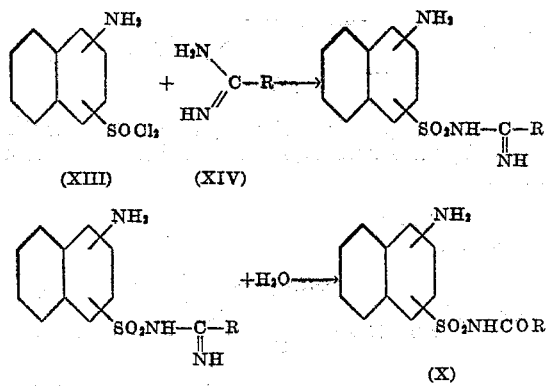

Aminonaphthalenesulfonacylamide may also be obtained by reacting nitronaphthalenesulfonylchloride (XV) with amidine and heating the same with an acid to produce nitronaphthalenesulfonacylamide (XVI) which in turn is reduced by a normal process, thus

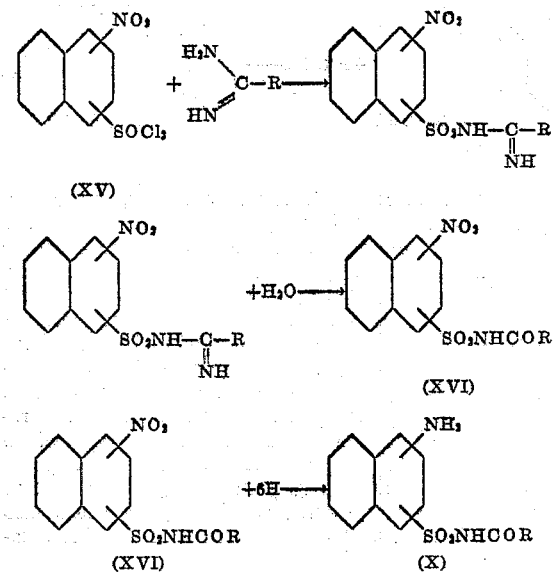

Compound (X) may be converted into compound (V) according to reaction (A) supra.

The acyl derivatives of aminonaphthalenesulfonamide represented by Formula V are in general colorless crystalline substances and well defined compounds. They are soluble in organic solvents and also soluble in aqueous alkali, forming alkali salts. Increase in the number of carbon atoms in the acyl groups results in a decrease in the solubility in water of the alkali salts.

These acyl derivatives of Formula V have been found to have antiviral property. The in vitro effect of the compounds may be illustrated as follows:

Test process: mixtures of infective brain suspension in concentration of $10^{-6.5}$ of Encephalites japonica, the Nakayama strain ($LD_{50}$ corresponding to $10^{-9.5}$) are prepared in 0.1–0.01% solution of the compound, and injected intracerebrally at 22° C. into groups of mice one hour after the mixing of the virus and the compound solution. Results are given in the following tables by survival ratios.

TABLE A

*In vitro effect of $N^1$-acyl-4-acetamino-naphthalenesulfonamide*

[Employed virus: The Nakayama strain of the Japanese encephalitis viruses; virus concentration: $10^{-6.5}$ medical solution concentration 0.05–0.01%; contact time: 1 hour (at 22° C.).]

| Acyl (COR) groups of the compounds | 0.05% | 0.025% | 0.01% |
|---|---|---|---|
| $—CO.CH_3$ | 0 | 0 | 0 |
| $—COCH_2.CH_3$ | 0 | 0 | 0 |
| $—CO(CH_2)_2CH_3$ | 0 | 0 | 0 |
| $—CO(CH_2)_4CH_3$ | 0 | 0 | 0 |
| $—CO(CH_2)_6CH_3$ | 5/10 | 0 | 0 |
| $—CO(CH_2)_8CH_3$ | 9/9 | 0 | 0 |
| $—CO(CH_2)_{10}CH_3$ | 9/9 | 7/10 | 2/10 |
| $—CO(CH_2)_{12}CH_3$ | 9/9 | 9/9 | 5/10 |
| $—CO(CH_2)_{14}CH_3$ | 9/10 | 7/8 | 5/10 |
| $—CO(CH_2)_{16}CH_3$ | 9/10 | 10/10 | 9/9 |
| $—CO(CH_2)_8CH—CH_2$ | 7/7 | 0 | 0 |
| $—CO(CH_2)_7CH=CH(CH_2)_7CH_3$ | 7/10 | 5/10 | 0 |
| $—COC_6H_5$ | 0 | 0 | 0 |
| $—CO—CH_2C_6H_5$ | 0 | 0 | 0 |
| $—CO.CH=CHC_6H_5$ | 0 | 0 | 0 |
| Control | 0/10 | ------- | ------- |

TABLE B

*In vitro effect of $N^1$-dodecanoyl-4-acylamino-naphthalenesulfonamide*

| $N^4$-acyl (COR') group of the compounds | 0.05% | 0.025% | 0.01% | K |
|---|---|---|---|---|
| $—COCH_2CH_3$ | 8/10 | 3/10 | 0/9 | 0/16 |
| $—CO(CH_2)_2CH_3$ | 10/10 | 3/10 | 0/10 | ------- |
| $—CO(CH_2)_4CH_3$ | 9/10 | 5/10 | 0/9 | ------- |
| $—CO(CH_2)_6CH_3$ | 7/10 | 6/10 | 0/10 | ------- |
| $—CO(CH_2)_8CH_3$ | 10/10 | 3/10 | 0/9 | ------- |
| $—CO(CH_2)_{10}CH_3$ | 0/9 | 0/8 | 0/9 | 0/10 |
| $—CO(CH_2)_{12}CH_3$ | 3/10 | 0/10 | 0/10 | ------- |
| $—CO(CH_2)_{14}CH_3$ | 0/9 | 10/10 | 0/9 | ------- |
| $—CO(CH_2)_{16}CH_3$ | 1/10 | 1/10 | 0/10 | ------- |
| $—CO(CH_2)_8CH=CH_2$ | 5/9 | 3/11 | 0/8 | ------- |

The virus dilutions in concentration of $10^{-2}$ of poliomyelitis virus, the Lansing strain ($LD_{50}$ corresponding to $10^{-4}$) were prepared in 0.3–0.01% solutions of the compounds, and injected intracerebrally into groups of mice at 22° C. one hour after the mixing of the virus and the compounds. Results are given in the following table.

TABLE C

*In vitro effect of $N^1$-acyl-4-acetaminonaphthalenesulfonamide*

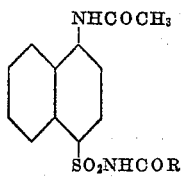

| Acyl (COR) groups of the compounds | 0.1% | 0.5% | 0.01% |
|---|---|---|---|
| —COCH$_3$ | 0 | 0 | |
| COCH$_2$CH$_3$ | 0 | 0 | |
| —CO(CH$_2$)$_2$CH$_3$ | 0 | 0 | |
| —CO(CH$_2$)$_4$CH$_3$ | 0 | 0 | |
| —CO(CH$_2$)$_6$CH$_3$ | 5/10 | 0 | |
| —CO(CH$_2$)$_8$CH$_3$ | 7/10 | 0 | |
| —CO(CH$_2$)$_{10}$CH$_3$ | 2/9 | 0 | |
| —CO(CH$_2$)$_{12}$CH$_3$ | 5/5 | 5/5 | |
| —CO(CH$_2$)$_{14}$CH$_3$ | 5/5 | 5/5 | |
| —CO(CH$_2$)$_{16}$CH$_3$ | 5/5 | 5/5 | |
| —CO(CH$_2$)$_8$CH=CH$_2$ | 9/9 | 10/10 | |
| —CO(CH$_2$)$_7$CH=CH(CH$_2$)$_7$CH$_3$ | 6/9 | 6/7 | |
| —COC$_6$H$_5$ | 0 | 0 | |
| —COCH$_2$C$_6$H$_5$ | 0 | 0 | |
| —COCH=CHC$_6$H$_5$ | 3/6 | 0 | |
| Control | 0/10 | | |

We have found that the several compounds are also effective in vivo, and have a curative effect clinically as well as a prophylactic effect. Consequently, it has been established that the compounds of this series have effectiveness against diseases due to virus, particularly neurotropic virus.

The following examples will further illustrate the invention without limiting it thereto. The parts are by weight unless otherwise indicated. The relationship between parts by weight and parts by volume is the same as that between grams and milliliters. Temperatures are in degrees centigrade.

EXAMPLE 1

$N^1$-dodecanoyl - 4 - acetylaminonaphthalenesulfonamide

Employing 5 parts of 4-acetylaminonaphthalenesulfonamide, about half thereof were suspended in 10 parts by volume of dry pyridine. The mixture was kept at 80–90°, and about one third of 4 parts of dodecanoyl chloride was gradually stirred thereinto. The remaining portion of the amide was then added to the mixture, and the remaining portion of the chloride was stirred thereinto dropwise, care being taken to maintain the temperature at not above 110° C. The reaction mixture was kept at 100–110° for 15 minutes to complete the reaction. The reaction mixture was poured into a mixed solution of 100 parts by volume of water and 11 parts by volume of concentrated hydrochloric acid, and the precipitate was recovered by filtration. The precipitate was dissolved in about 200 parts by volume of warm water, the pH adjusted to 9 with caustic soda, and filtered. The filtrate was acidified with acetic acid for reprecipitation. The resulting precipitate was crude N-dodecanoyl-4-acetylaminonaphthalenesulfonamide with melting point of 182°. The yield was 6.5 parts, a portion of which was recrystallized from 80% alcohol.

Melting point: 200–201°.
Colorless, minute and plate-like crystals.
Analysis: Calculated for $C_{24}H_{34}O_4N_2S$: N, 6.28. Found: N, 6.41.

EXAMPLE 2

$N^1$-tetradecanoyl - 4-acetylaminonaphthalenesulfonamide

About half of 3.2 parts of 4-acetylaminonaphthalenesulfonamide was suspended in 8 parts by volume of dry pyridine, and kept at 80–90°, about one third of 2.7 parts of tetradecanoyl chloride being gradually stirred into the reaction mixture. The remaining amide was then added, and the remaining chloride added dropwise, carefully maintaining the temperature at not exceeding 110°. The stirring was continued for 15 minutes at 100–110° to complete the reaction. The reaction mixture was then poured into a mixed solution of about 100 parts by volume of water and 8 parts by volume of concentrated hydrochloric acid to separate the precipitate. The precipitate was recovered by filtration, and dissolved in about 150 parts by volume of warm water. The pH of the solution was adjusted to 9 with caustic soda, and the solution filtered. The filtrate was acidified with acetic acid and the product reprecipitated. The recovered precipitate was crude $N^1$-tetradecanoyl-4-acetylaminonaphthalenesulfonamide. The yield was 5 parts, a portion of which was recrystallized from 80% alcohol.

Melting point: 152–156.5°.
White and plate-like crystals.
Analysis: Calculated for $C_{26}H_{38}O_4N_2S$: N, 5.94. Found: N, 5.78.

EXAMPLE 3

$N^1$-hexadecanoyl - 4-acetylaminonaphthalenesulfonamide

About half of 6 parts of 4-acetylaminonaphthalenesulfonamide was suspended in 12 parts by volume of dry pyridine, and kept at 80–90°. About one third of 5.5 parts of hexadecanoyl chloride was gradually stirred into the reaction mixture. The remaining amide was then added, and the remaining chloride was stirred thereinto, carefully keeping the temperature at not exceeding 110°. The stirring was continued for 15 minutes at 100–110° to complete the reaction. The reaction mixture was poured into a mixture of about 100 parts by volume of water and 12 parts by volume of concentrated hydrochloric acid to separate a precipitate. After filtration, the residue was dissolved in about 150 parts by volume of warm water, pH being adjusted to 9 with caustic soda. After filtration, the filtrate was acidified with acetic acid, and the resultant precipitate was recovered by filtration. There was obtained crude $N^1$-hexadecanoyl-4-acetylaminonaphthalenesulfonamide having a melting point of 151–158°. The yield was 7 parts, a portion of which was recrystallized from 80% alcohol.

Melting point: 169–170.5°.
White and plate-like crystals.
Analysis: Calculated for $C_{28}H_{42}O_4N_2S$: N, 5.58. Found: N, 5.72.

EXAMPLE 4

$N^1$-octadecanoyl - 4-acetylaminonaphthalenesulfonamide

About half of 5 parts of 4-acetylaminonaphthalenesulfonamide was suspended in 10 parts by volume of dry pyridine, the temperature being kept at 80–90°. About one-third of 5 parts of octadecanoyl chloride was then stirred thereinto. The remaining amide was added and the remaining chloride was then stirred thereinto, carefully keeping the temperature at not exceeding 110°. The stirring was continued for 15 minutes at 100–110° to complete the reaction. The reaction mixture was poured into a mixture of about 100 parts by volume of water and 10 parts by volume of concentrated hydrochloric acid, the separated precipitate being recovered by filtration. The precipitate was dissolved in about 150 parts by volume of warm water, the pH being adjusted to 9 with caustic soda, and filtered. The filtrate was acidified with acetic acid, and the resultant precipitate was recovered by filtration. Crude $N^1$-octadecanoyl-4- acetylaminonaphthalenesulfonamide having a melting point of 162–165° was obtained. The yield was 8 parts, a portion of which was recrystallized from 80% alcohol.

Melting point: 169.5–170.5°.
White and small plate-like crystals.
Analysis: Calculated for $C_{30}H_{46}O_4N_2S$: N, 5.28. Found: N, 5.39.

EXAMPLE 5

$N^1$-undecylenyl-4-acetylaminonaphthalenesulfonamide

About half of 6 parts of 4-acetylaminonaphthalenesulfonamide was suspended in 10 parts by volume of dry pyridine and the temperature was kept at 70–80°. About one third of 4 parts of undecylenyl chloride was gradually stirred into the reaction mixture. The reaction mixture was then maintained at 100–105°, the remaining amide was added thereto, and then the remaining chloride was stirred thereinto, carefully maintaining the temperature at not exceeding 110°. The stirring was continued for 20 minutes to complete the reaction. The reaction mixture was then poured into a mixture of about 50 parts by volume of water and 12 parts by volume of concentrated hydrochloric acid, the separated precipitate being recovered by filtration. The precipitate was dissolved in about 300 parts by volume of warm water, the pH adjusted to 9 with caustic soda, and filtered. The filtrate was acidified with acetic acid to effect reprecipitation. The precipitate was recovered by filtration to obtain crude $N^1$-undecylenyl-4-acetylaminonaphthalene-sulfonamide having a melting point of 164–168°. The yield was 7.5 parts, a portion of which was recrystallized from 70% alcohol.

Melting point: 167–173°.
Colorless, rhombus and plate-like crystals.
Analysis: Calculated for $C_{23}H_{30}O_4N_2S$: N, 6.52. Found: N, 6.53.

EXAMPLE 6

$N^1$-oleyl-4-acetylaminonaphthalenesulfonamide

About half of 6 parts of 4-acetylaminonaphthalenesulfonamide was suspended in 12 parts by volume of dry pyridine, and the temperature was maintained at 70–80°. About one third of 6 parts of 9-octadecanoyl chloride was gradually stirred into the reaction mixture. The reaction mixture was then maintained at a temperature of 100–105°, the remaining amide was added thereto and then the remaining chloride was stirred thereinto, carefully maintaining the temperature at not exceeding 110. The stirring was continued for 20 minutes at 105–110°, to complete the reaction. The reaction mixture was poured into a mixed solution of about 50 parts by volume of water and 12 parts by volume of concentrated hydrochloric acid, and the separated precipitate was recovered by filtration. The precipitate was then dissolved in about 300 parts by volume of warm water, the pH being adjusted to 9 with caustic soda, and filtered. The filtrate was acidified with acetic acid and reprecipitated. The crude $N^1$-oleyl-4-acetylaminonaphthalenesulfonamide obtained had a melting point of 149–153°. The yield was 8.5 parts, a portion of which was recrystallized from 85% alcohol.

Melting point: 159.5–161°.
White and powdery crystals.
Analysis: Calculated for $C_{30}H_{44}O_4N_2S$: N, 5.30. Found: N, 5.32.

EXAMPLE 7

$N^1$-dodecanoyl-$N^4$-propionyl-4-amino-napthalenesulfonamide 1.4 parts of 4-propionylaminonaphthalenesulfonamide were suspended in 6 parts by volume of pyridine, and kept at 90–100° with stirring. 1.1 parts of dodecanoyl chloride were gradually poured into the reaction mixture. The stirring was continued for 15 minutes at 100–110° to complete the reaction. The reaction mixture, after cooling, was poured into a mixture of 30 parts by volume of water and 6 parts by volume of concentrated hydrochloric acid to separate the precipitate which was collected by filtration to obtain a crude product $N^1$-dodecanoyl-$N^4$-propionyl-4-aminonaphthalenesulfonamide. The crude product was recrystallized twice from 70% alcohol.

Melting point: 152.5–154.5°.
Small plate-like crystals, soluble in caustic alkali solution.
Yield: 1.3 parts. Readily soluble in hot alcohol.
Analysis: Calculated for $C_{25}H_{36}O_4N_2S$: N, 6.09. Found: N, 6.11.

EXAMPLE 8

$N^1$-octanoyl-5-acetylaminonaphthalenesulfonamide 0.3 part of $N^1$-octanoyl-5-aminonaphthalenesulfonamide was added to 1 part by volume of acetic anhydride, and after keeping at a temperature of 50–60° for 15 minutes, the mixture was cooled down. To this reaction mixture was added a small quantity of toluene, and the separated precipitate was collected by filtration. The collected precipitate—$N^1$ - octanoyl - 5 - acetylaminonaphthalenesulfonamide—was then recrystallized twice from 90% alcohol.

Melting point: 220–223°.
Colorless, needle-like crystals.
Yield: 0.18 part.
Analysis: Calculated for $C_{20}H_{26}O_4N_2S$: N, 7.18. Found: N, 6.89.

EXAMPLE 9

$N^1$-dodecanoyl-5-acetylaminonaphthalenesulfonamide 0.8 part of $N^1$-dodecanoyl-5-aminonaphthalenesulfonamide was added to 3 parts by volume of acetic anhydride, and after heating to 50–60° for 15 minutes, the mixture was cooled down. A small amount of toluene was then added to the reaction mixture, and the separated precipitate was collected by filtration. The collected precipitate—$N^1$ - dodecanoyl - 5 - acetylaminonaphthalenesulfonamide—was recrystallized twice from 85% alcohol.

Melting point: 183–184°.
Colorless and flaky crystals.
Yield: 0.6 part.
Analysis: Calculated for $C_{24}H_{34}O_4N_2S$: N, 6.28. Found: N, 6.25.

EXAMPLE 10

$N^2$-dodecanoyl-8-acetylaminonaphthalenesulfonamide 2.5 parts of 8-nitro-naphthalenesulfonamide-(2) were added to 8 parts by volume of pyridine. The mixture was heated to 90–100°, and 2.2 parts of dodecanoyl chloride were stirred thereinto dropwise. The temperature was then raised to 105–110°, which temperature was maintained for 15 minutes. The reaction mixture was then poured into 50 parts by volume of water admixed with 8 parts by volume of concentrated hydrochloric acid. The resulting precipitate was recrystallized from alcohol to obtain 3.1 parts of product.

Melting point: 157–158°.
Light yellowish plate-like crystals.
Analysis: Calculated for $C_{22}H_{30}O_5N_2S$: N, 6.45%. Found: N, 6.51%.

2.2 parts of the so-obtained $N^2$-dodecanoyl-8-nitro-naphthalenesulfonamide were dissolved in 50 parts by volume of alcohol. To this solution was added palladium-carbon prepared from 5 parts by volume of 15% $PdCl_2$ and 0.5 part of active carbon to subject the solution to catalytic reduction. After the calculated amount of hydrogen had been absorbed, the reaction mixture was filtered. Alcohol was distilled off from the filtrate, and the residue was recrystallized from methanol to obtain 1 part of final product, $N^2$-dodecanoyl-8-aminonaphthalenesulfonamide.

Melting point: 129°.
Yellowish flaky crystals.
Analysis: Calculated for $C_{22}H_{32}O_3N_2S$: N, 6.92%.
Found: N, 6.89%.

0.5 part of $N^2$-dodecanoyl-8-aminonaphthalenesulfonamide-(2) was added to 2 parts by volume of acetic anhydride. The mixture was boiled for 30 minutes on an oil bath, and then poured into ice water. The separated solids were filtered out. The solid material was recrystallized from 70% alcohol, and 0.3 part of the final product, $N^2$-dodecanoyl-8-acetylaminonaphthalenesulfonamide, was obtained.

Melting point: 122–124°.
Colorless flaky crystals.
Analysis: Calculated for $C_{24}H_{34}O_4N_2S$: N, 6.28%.
Found: N, 6.32%.

The advantageous effect of the compounds according to the present invention may be illustrated by the following examples:

EXAMPLE 11

4-acetylaminonaphthalene-1-sulfonlauroylamide, when caused to act in a tube with the Nakayama strain of the Japanese encephalitis viruses of $10^{-6.5}$ (100 $LD_{50}$) concentration at 22°, restrains the virus infection.

EXAMPLE 12

4-acetylaminonaphthalene-1-sulfonlauroylamide, when administered in an amount of 75 mg./kg. into veins of mice which had been intranasally infected with the Nakayama strain of the Japanese encephalitis viruses, showed approximately 0.5–0.2 order increase in $LD_{50}$ in comparison with $LD_{50}$ of untreated mice group.

EXAMPLE 13

4-acetylaminonaphthalene-1-sulfonlauroylamide, when administerd to mice at any time between 1 to 120 minutes after intranasal infection with the Nakayama strain of the Japanese encephalitis viruses, showed the same effect as in Example 12 by a single administration.

EXAMPLE 14

When 4-acetylaminonaphthalene-1-sulfonlauroylamide were orally administered to mice, and thereafter the Nakayama strain of the Japanese encephalitis viruses was intranasally administered to such mice so that they were infected, 1.0–0.5 order increase of $LD_{50}$ was observed in comparison with $LD_{50}$ of untreated mice group. In experimental infection of encephalitis viruses, even when the viruses were inoculated four days after the administration of this compound, the above-mentioned effect was observed.

EXAMPLE 15

According to the report of Komagome Hospital of Tokyo where 5%–5.0 cc. injection liquid of 4-acetylaminonaphthalene-1-sulfonlauroylamide was intravenously administered to seriously ill patients with Japanese encephalitis, for two days at a rate of 1 to 2 times per day, the death rate was 36%, showing a remarkable decrease in death rate, and the patients recovered free from serious results. During the year of 1953, the number of encephalitis patients throughout the prefecture of Tokyo except those in the hospital utilizing the present compound, was 194 persons of which 55 persons died showing a death rate of 28.3%, while the number of patients in Komagome Hospital of Tokyo where the present compound was utilized, was 37 persons of which 6 persons died, showing a death rate of 16.2%.

EXAMPLE 16

4-acetylamino-1-naphthalenesulfonlauroylamide, when caused to act at 22° on virus of the Lausing Strain of Poliomyelitis virus of $10^{-2}$ (15 $LD_{50}$) concentration, restrains the infecting effect of the viruses at 0.01% concentration.

EXAMPLE 17

$N^1$ - dodecanoyl-4-acetylaminonaphthalenesulfonamide was examined as to its antiviral effect on barnyard fowls suffering from Newcastle virus, which were found in Osaka district, Japan, in March 1954.

(1) 12 adult fowls in critical condition were divided into a treated group and an untreated group. Each fowl of the treated group was subjected to the following treatment, viz., a dose of 1 cc./kg. of the drug solution (5 mg./cc.), i.e. 5 mg./kg., was intravenously or subcutaneously injected for ten days, once daily. The symptoms of the disease and the survival ratio were observed for another 20 days. All the fowls of the treated group recovered with a survival ratio of 6/6, while all the fowls of the untreated group died with a survival ratio of 0/6. From the above it is evident that the curative effect of the drug is surprisingly high.

(2) 400 young fowls living in a hen house of about 30 square meters area were found to be suffering from Newcastle disease, and when 150 of them had died, the drug was first employed. Dumplings were prepared from mixed powders of the drug and bait, one dumpling including about 25 mg. of the drug. After oral administration of the dumplings thrice a day for 7 days, the symptoms of disease were observed for another 20 days. Only one fowl died, while all other fowls recovered, or showed no symptom of disease.

The present application is a division of copending application Serial No. 437,582, filed June 17, 1954, now abandoned.

What is claimed is:

1. A compound which corresponds to the formula

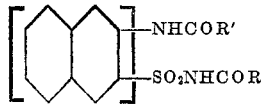

wherein R' is a $C_1$–$C_4$ alkyl radical and R is a $C_7$–$C_{18}$ alkyl radical.

2. A compound which corresponds to the formula

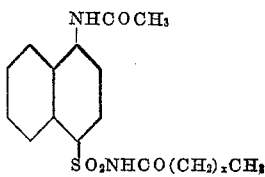

wherein $x$ is an integer from 10 to 16 inclusive.

3. $N^1$-dodecanoyl - 4 - acetaminonaphthalenesulfonamide represented by the formula

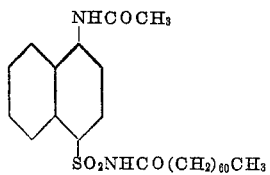

4. $N^1$-tetradecanoyl - 4 - acetaminonaphthalenesulfonamide represented by the formula

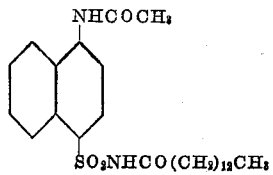

5. N¹-hexadecanoyl - 4 - acetaminonaphthalenesulfonamide represented by the formula
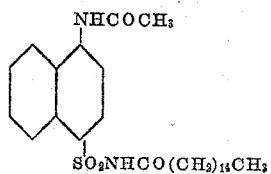
6. N¹-octadecanoyl - 4 - acetaminonaphthalenesulfonamide represented by the formula
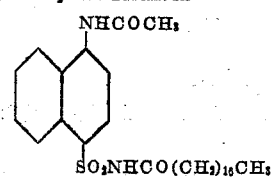
References Cited in the file of this patent
UNITED STATES PATENTS
| | | |
|---|---|---|
| 2,323,651 | Dohrn | July 6, 1943 |
| 2,394,307 | Hentrich | Feb. 6, 1946 |
| 2,411,495 | Dohrn | Nov. 19, 1946 |